United States Patent [19]

Gertz

[11] Patent Number: 5,199,755
[45] Date of Patent: Apr. 6, 1993

[54] VEHICLE IMPACT ATTENUATING DEVICE
[75] Inventor: David C. Gertz, Citrus Heights, Calif.
[73] Assignee: Energy Absorption Systems, Inc., Chicago, Ill.
[21] Appl. No.: 825,301
[22] Filed: Jan. 24, 1992

Related U.S. Application Data
[63] Continuation-in-part of Ser. No. 679,919, Apr. 3, 1991, abandoned.
[51] Int. Cl.⁵ .................................. B60R 19/04
[52] U.S. Cl. .................... 293/120; 188/377; 256/1; 256/13.1; 267/122; 267/140; 293/110; 293/118; 293/132; 293/133; 293/136; 293/155
[58] Field of Search .............. 293/38, 42, 48, 102, 293/110, 118, 120, 132, 133, 136, 155; 188/377; 267/122, 140; 256/1, 13.1

[56] References Cited
U.S. PATENT DOCUMENTS

| | | | |
|---|---|---|---|
| 3,721,433 | 3/1973 | Sobel | 293/136 X |
| 4,008,915 | 2/1977 | Walker | 293/102 |
| 4,101,115 | 7/1978 | Meinzer | 256/13.1 |
| 4,190,275 | 2/1980 | Mileti | 293/102 |
| 4,200,310 | 4/1980 | Carney, III | 280/784 |
| 4,635,981 | 1/1987 | Friton | 293/1 |
| 4,658,941 | 4/1987 | Gottwald et al. | 188/377 |
| 4,674,911 | 6/1987 | Gertz | 293/110 X |
| 4,711,481 | 12/1987 | Krage et al. | 293/133 |
| 4,770,420 | 9/1988 | Gottwald et al. | 293/104 |
| 4,810,028 | 3/1989 | Henricks | 296/188 |

FOREIGN PATENT DOCUMENTS

| | | | |
|---|---|---|---|
| 0165738 | 12/1985 | European Pat. Off. | |
| 1262561 | 4/1961 | France | 293/133 |
| 99837 | 8/1981 | Japan | 293/132 |

Primary Examiner—Charles A. Marmor
Assistant Examiner—Andrew C. Pike
Attorney, Agent, or Firm—Willian Brinks Olds Hofer Gilson & Lione

[57] ABSTRACT

An impact attenuating device such as a truck mounted attenuator includes at least two cartridges, which are secured together by flanges and angled backing elements on adjacent portions of the upper and lower sheets of the cartridges. The forwardmost bay of the impact attenuating device includes stiffening elements on the lower surface and deformable elements which come closely adjacent to the lower surface of the impact attenuating device in order to urge an impacting vehicle with having a low bumper height upwardly, toward the center of the impact attenuating device. The end of the impact attenuating device initially struck by an impacting vehicle is covered by a resilient collapsible element having parallel pleats and recessed corners, such that the collapsible element can absorb low energy impacts without damage to the impact attenuating device.

18 Claims, 8 Drawing Sheets

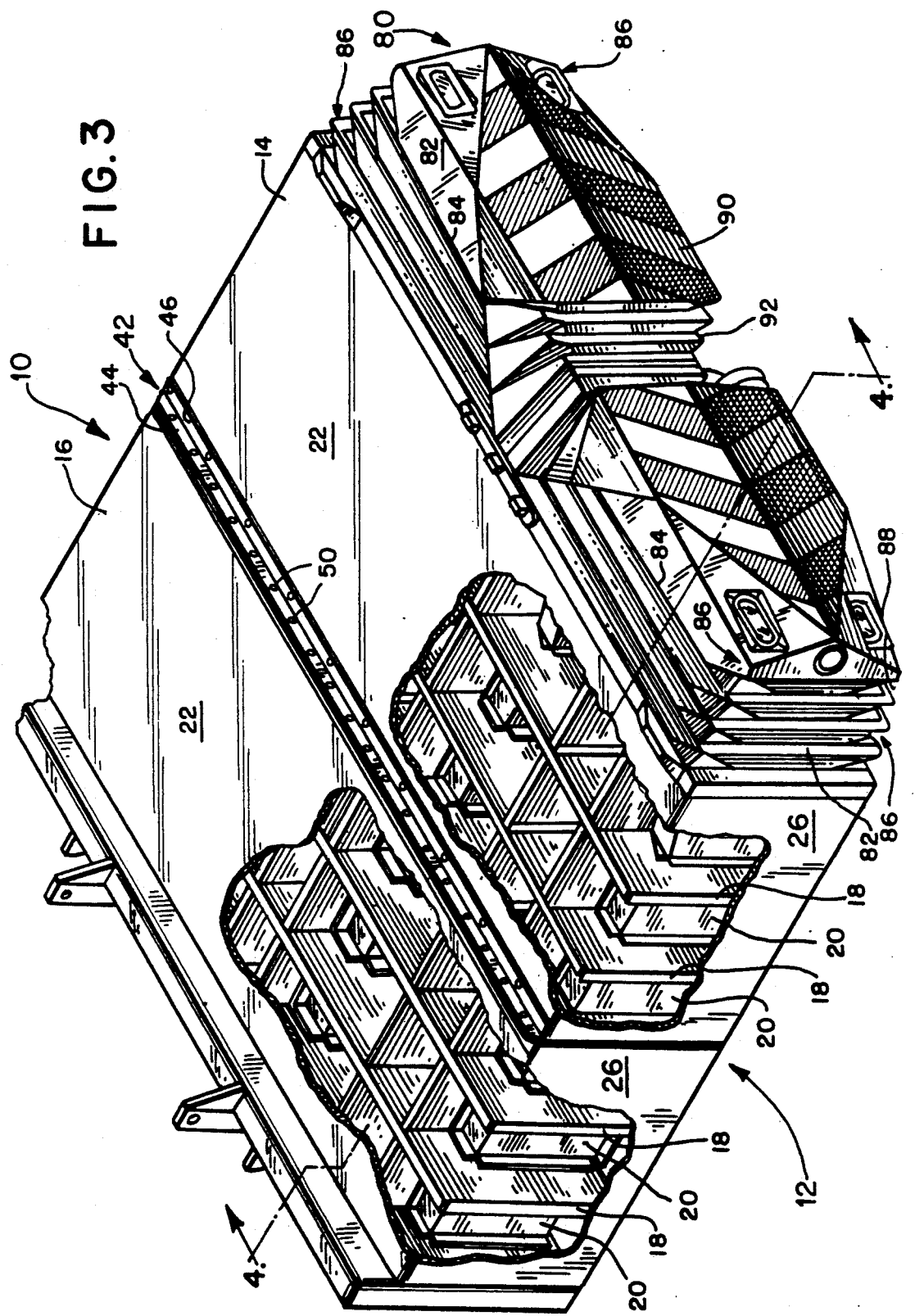

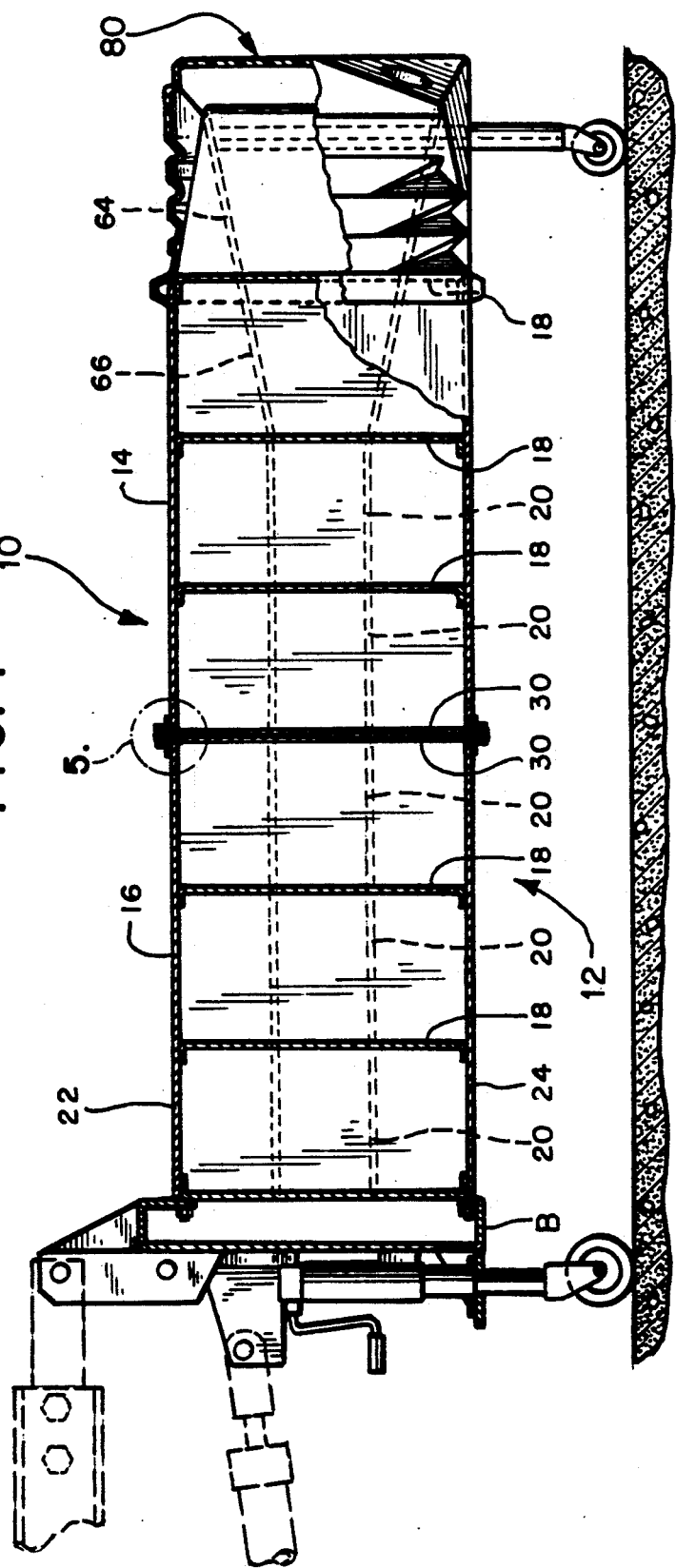

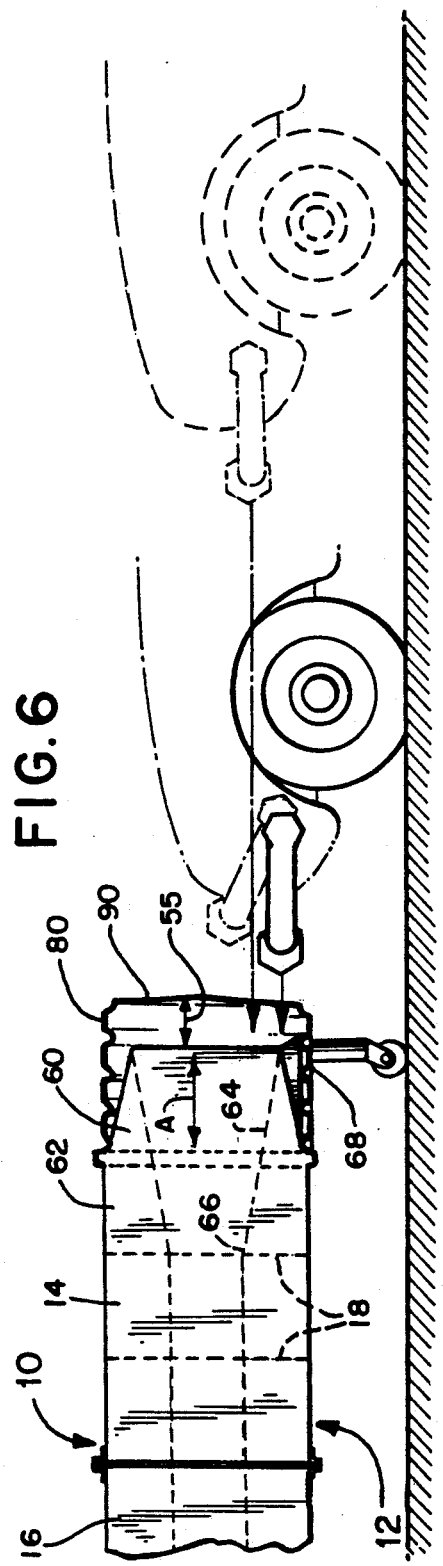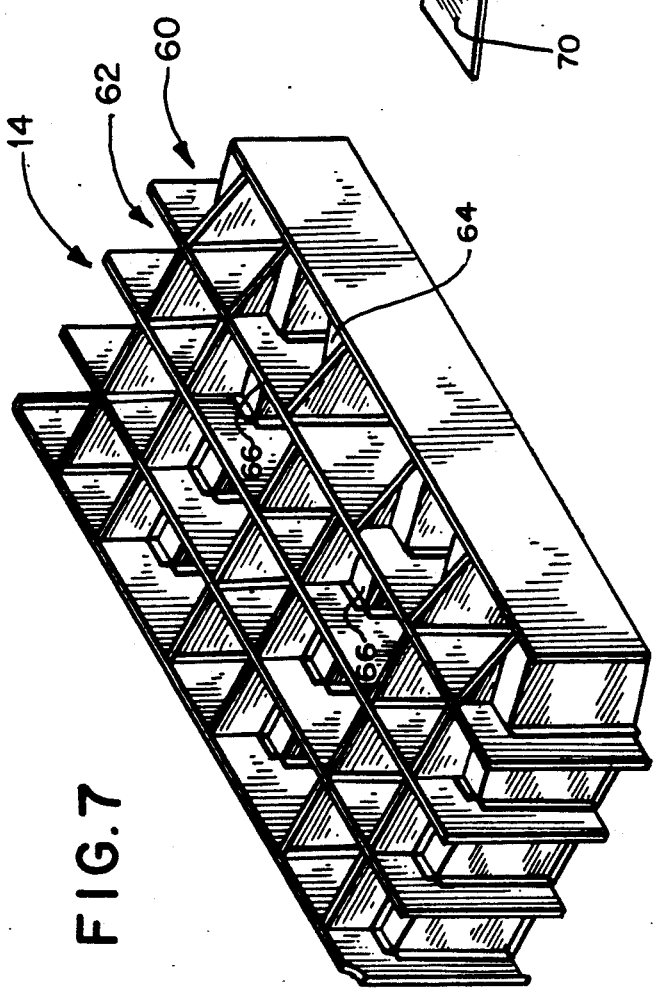

VEHICLE IMPACT ATTENUATING DEVICE

This application is a continuation-in-part of application Ser. No. 07/679,919, filed Apr. 3, 1991, now abandoned.

BACKGROUND OF THE INVENTION

This invention relates to an improved impact attenuating device adapted to be mounted on a vehicle, of the type comprising an energy absorbing element and a mounting arrangement coupled to the energy absorbing element and configured to mount the energy element on the vehicle.

Krage et al. U.S. Pat. No. 4,711,481 discloses a vehicle impact attenuating device of the general type described above. The disclosed device (which is often referred to in the industry as a truck mounted attenuator or TMA) is typically installed at the rear of a highway maintenance vehicle which in use is often parked alongside a roadway. A TMA extends rearwardly from the vehicle and is designed to collapse in an impact, thereby protecting the occupants of an impacting vehicle from injury.

The TMA of the Krage patent includes a generally rectangular box made up of sheet aluminum. Aluminum sheet diaphragms extend in parallel vertical planes across the interior of the box, and cell assemblies are interposed between adjacent diaphragms. Each cell assembly is formed of two L-shaped sheet metal components which are riveted together to form a rectangular column extending between the adjacent diaphragms. The cell assemblies are deformed in an impact, and the configuration of the cell assemblies and in particular the diagonal bracing between adjacent columns increases the energy absorbing capacity of the columns.

The Krage TMA has been found effective in use and has been commercially successful. However, the structure of the Krage TMA is essentially a single integrated module. A collision which damages any part of this module will often require that the entire module be replaced. Additionally, a vehicle having a bumper unusually close to the ground may have a tendency to dive under the end of the TMA in an impact. In the event this should happen, the stopping efficiency of the TMA is reduced.

SUMMARY OF THE INVENTION

Accordingly, it is an object of this invention to provide an improved impact attenuating device that is arranged to reduce damage to the attenuating device and to allow undamaged parts to be reused.

It is another object of this invention to reduce any tendency of an impact attenuating device to be lifted in an impact.

According to a first aspect of this invention, a collapsible element is mounted to one end of an energy absorbing element included in an impact attenuating device of the type described in the first paragraph of the last section. This collapsible element has a foldable configuration which defines an end portion spaced from the energy absorbing element, such that the end portion is moveable toward the energy absorbing element by a selected amount in an impact without damaging the energy absorbing element. The collapsible element is formed of a resilient material adapted to deform and then recover after a low energy impact. Preferably, the side surfaces of the collapsible element define generally parallel pleats, and the corners between adjacent side surfaces define recesses that are deeper than the pleats in order to facilitate collapse of the collapsible element.

This aspect of the invention reduces damage to the energy absorbing element in a low energy impact, and thereby reduces the need to replace the energy absorbing element in certain situations.

According to a second aspect of this invention, an impact attenuating device of the type described initially above is provided with a first cartridge having upper and lower sheets which define outer surfaces of the first cartridge. These upper and lower sheets define upper and lower flanges, respectively, which extend outwardly from the cartridge. Upper and lower backing plates are each aligned with a respective one of the flanges. A plurality of fasteners are positioned to pass through openings in the flanges and the backing plates to mount the first cartridge to a supporting structure.

Preferably, the energy absorbing element includes two or more cartridges, and adjacent cartridges are interconnected with one another as described above. With this approach, individual cartridges can be removed for replacement. For example, in a moderate energy impact the forward cartridge may be damaged in stopping the impacting vehicle, but the rearward cartridge may remain undamaged. In this event, the fasteners can be released to allow the forward cartridge to be removed from the rearward cartridge for replacement. In this way, the need to replace the rearward cartridge is reduced.

According to a third aspect of this invention, the energy absorbing element of an impact attenuating device of the type described initially above is provided with first and second bays, wherein the first bay is positioned farther from the mounting arrangement that mounts the energy absorbing element to the vehicle than is the second bay. Means are situated in the first bay for upwardly urging an impacting vehicle having a tendency to move under the first bay, toward a vertically centered portion of the first bay. This means can comprise deformable elements in the first bay that are positioned to diverge from each other in a vertical direction. Alternately or in combination, the urging means can include at least one stiffening element positioned at a lower surface of the first bay to deflect an impacting vehicle upwardly, toward the vertically centered portion of the first bay.

By selectively stiffening the bottom portion of the first bay, an impacting vehicle with a low bumper height can be urged upwardly towards the center of the impact attenuating device. In this way, any tendency of an impacting vehicle to dive under the impact attenuating device is reduced, and stopping efficiencies are increased.

The invention itself, together with further objects and attendant advantages, will best be understood by reference to the following detailed description, taken in conjunction with the accompanying drawings.

BRIEF DESCRIPTION OF THE DRAWINGS

FIG. 3 is an enlarged perspective view in partial cutaway of the impact attenuating device of FIG. 1.

FIG. 4 is cross-sectional view taken along line 4—4 of FIG. 3.

FIG. 5 is an enlarged sectional view of the encircled region 5 of FIG. 4.

FIG. 6 is a partially schematic representation of the impact attenuating device of FIG. 1 as it is impacted by a vehicle having a front bumper that is unusually close to the ground.

FIG. 7 is a perspective view of interior components of the forward cartridge of the impact attenuating device of FIG. 1.

FIG. 10 is a perspective view of a stiffening element included in the impact attenuating device of FIG. 2.

DETAILED DESCRIPTION OF THE PRESENTLY PREFERRED EMBODIMENTS

Figure 1:
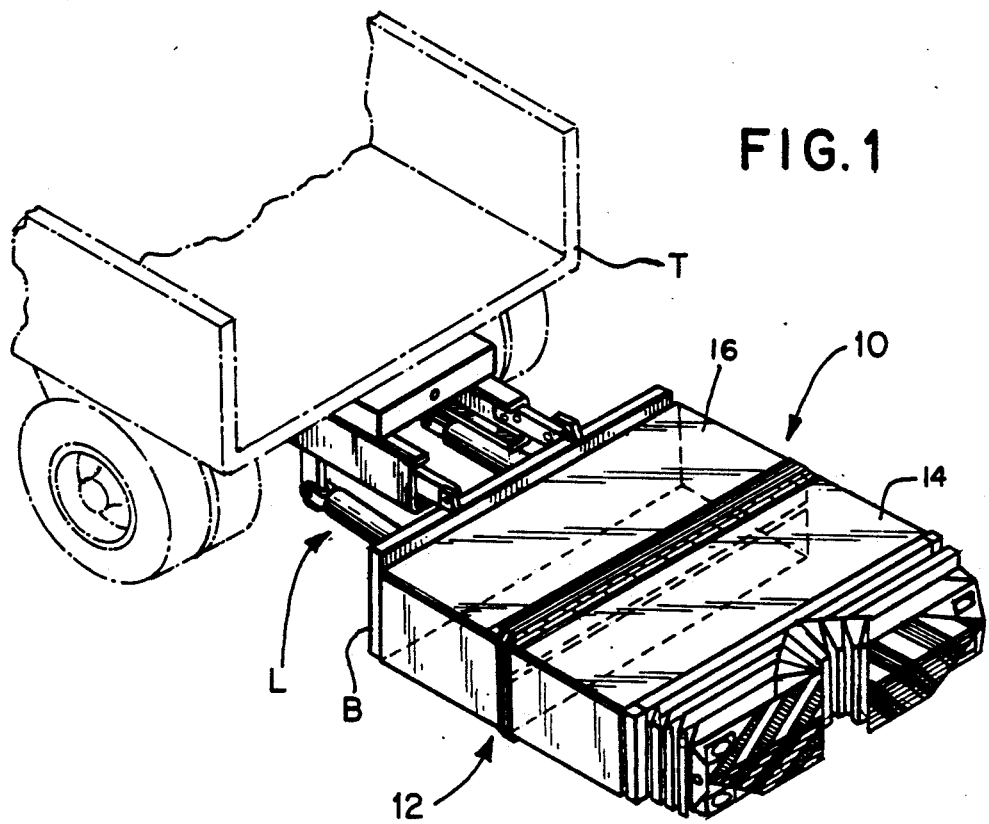
FIG. 1 is a perspective view of an impact attenuating device that incorporates a presently preferred embodiment of this invention, as mounted on a truck shown in dot-dash lines.

Turning now to the drawings, FIGS. 1-4 show an impact attenuating device 10 which includes an energy absorbing element 12 made up of a front cartridge 14 and a rear cartridge 16 secured together as described below.

Each of the cartridges 14, 16 comprises an array of spaced parallel diaphragms 18 with cell assemblies 20 interposed between adjacent diaphragms 18 (FIGS. 3 and 4). The diaphragms 18 and the cell assemblies 20 are surrounded by a skin of sheet metal comprising upper and lower sheets 22, 24 and side sheets 26. The diaphragms 18 at the extreme ends of the cartridges 14, 16 form end walls 30 (FIG. 5).

The rear cartridge 16 is secured to a conventional backing plate B, which is in turn secured to the rear of a truck T by a conventional lifting mechanism L (FIG. 1).

The detailed construction and arrangement of the cell assemblies 20 is quite similar to that described in Krage U.S. Pat. No. 4,711,481, except for the differences described below. The detailed disclosure of Krage U.S. Pat. No. 4,711,481 is hereby incorporated by reference into this application.

Figure 2:
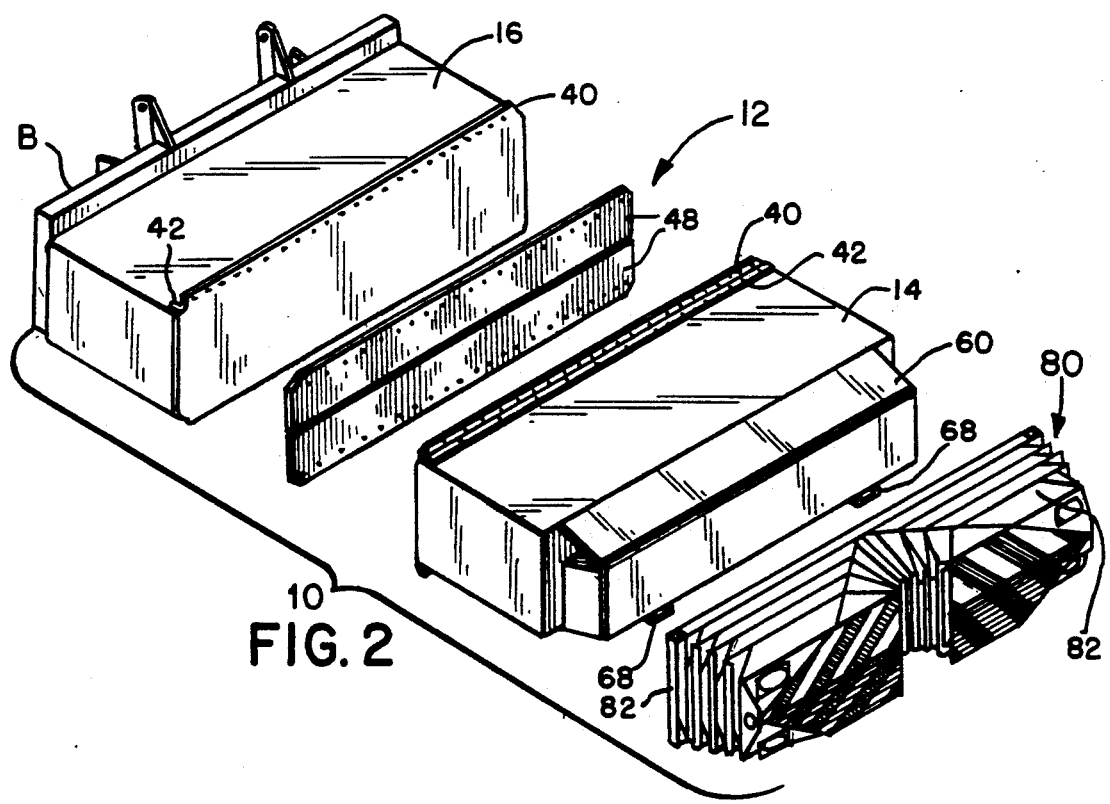
FIG. 2 is an exploded perspective view of the impact attenuating device of FIG. 1.
Figure 8A:
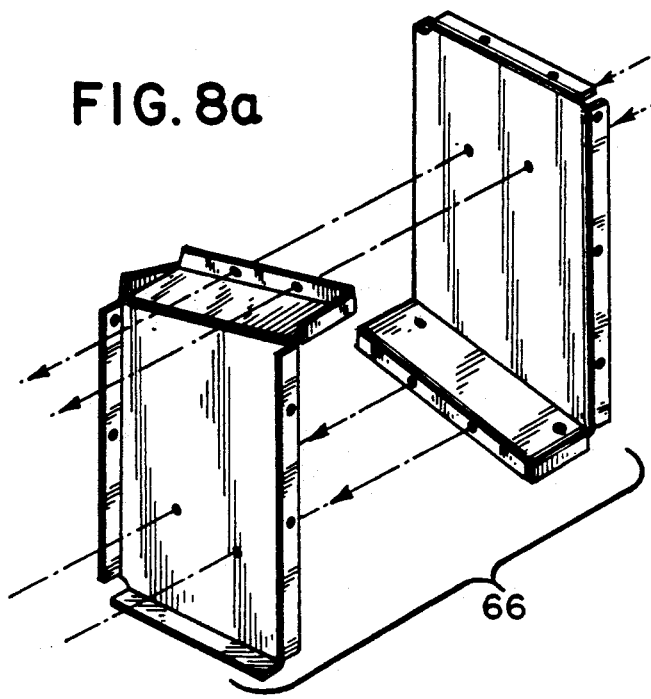
FIGS. 8a and 8b are an exploded perspective and an assembled perspective view, respectively, of an energy absorbing element of the second bay of the cartridge of FIG. 7.
Figure 8B:
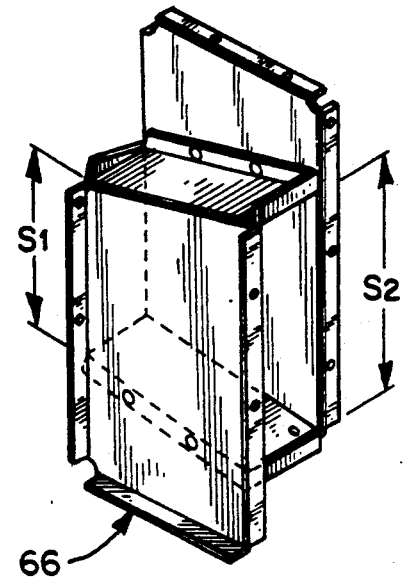
Figure 9A:
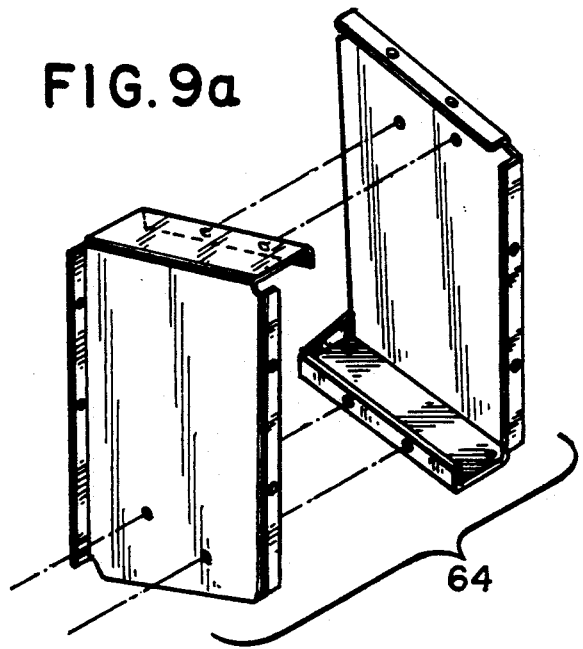
FIGS. 9a and 9b are an exploded perspective view and an assembled perspective view, respectively, of an energy absorbing element of the first bay of the cartridge of FIG. 7.
Figure 9B:
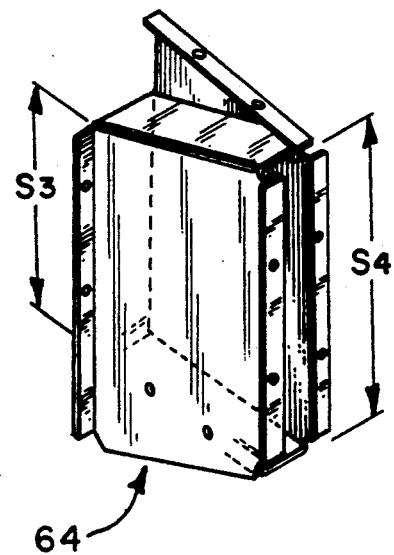

Turning now to FIGS. 2, 4, and 5, the front and rear cartridges 14, 16 are connected together in a releasable manner. Each of the upper and lower sheets 22, 24 defines a respective flange 40 extending at right angles to the adjacent sheets 22, 24. The flanges 40 each form an array of openings as shown in FIG. 2. Positioned immediately adjacent each of the flanges 40 is a backing element 42 which in this preferred embodiment is an angle element having a first part 44 lying alongside the respective flange 40, and a second part 46 lying alongside the respective sheet 22, 24. The first parts 44 of the backing elements 42 define openings aligned with the openings in the flanges 40. The end walls 30 include edge portions that extend upwardly between the flanges 40, and also define openings aligned with the openings in the flanges 40. The second parts 46 are secured to the sheets 22, 24 with fasteners such as rivets.

As explained in detail in Krage U.S. Pat. No. 4,711,481, the cell assemblies 20 are riveted together and to the diaphragms 18. The exposed heads of some of the rivets extend outside the end walls 30, and in order to prevent an interference between adjacent rivets an elastomeric sheet 48 is interposed between the adjacent end walls 30. The sheet 48 may define openings (not shown) to receive the exposed rivet heads. Fasteners 50 extend through the flanges 40, the backing elements 42, the end walls 30, and the elastomeric sheet 48 in order to secure the front and rear cartridges 14, 16 together. The elastomeric sheet 48 inhibits sliding movement between the adjacent end walls 30 and thereby increases the shear strength of the connection between the cartridges.

In this assembly, the upper and lower sheets 22, 24 act as tensile elements that contribute to the structural rigidity of the energy absorbing element 12. The connection comprising the flanges 40 and the backing elements 42 extends from one side to the other of each of the cartridges 14, 16 and provides a secure attachment without interfering with collapse of the cartridges 14, 16 in an impact. As explained in the above referenced Krage patent, the forward end of the energy absorbing element 12 is preferably made more easily collapsible than the rearward end by properly selecting the number of cell assemblies 20. As a consequence, in an intermediate energy collision, only the forward bays in the front cartridge 14 are deformed, and the rear cartridge 16 is often undamaged. In this event, the fasteners 50 can be removed and a new front cartridge can be installed on the existing rear cartridge 16. In this way, the need to replace the rear cartridge, and associated maintenance costs, are reduced.

Turning now to FIGS. 6-9b, the front cartridge 14 defines a first bay 60 and a second bay 62. The first bay 60 is disposed at the extreme end of the energy absorbing element 12 remote from the truck, and the first bay 60 is the first of the bays that is initially struck by an impacting vehicle.

The first bay 60 includes first deformable elements 64, and the second bay 62 includes second deformable elements 66. In each case, the deformable elements 64, 66 are formed in this embodiment of aluminum plates (FIGS. 8a-9b). The first and second deformable elements 64, 66 are similar to those described in the above-identified Krage patent, except that they define tapered cells which diverge in a vertical direction rather than the cells of constant vertical spacing of the Krage patent. The rearward ends of the second deformable elements 66 have a vertical separation S1 comparable to that of the rearwardly adjacent cell assemblies 20. However, the forward ends of the second deformable elements 66 have a substantially greater vertical separation S2. Similarly, the rearward ends of the first deformable elements 64 have a vertical separation S3 comparable to the vertical separation S2 of the forward ends of the second deformable elements 66, and the forward ends of the first deformable elements 64 have a substantially greater vertical separation S4.

Also, as shown in FIGS. 2, 6, and 10, a pair of stiffening elements 68 are mounted to the underside of the first bay 60. Each stiffening element 68 has a tapered channel configuration, including flanges 70 through which fasteners pass to mount the stiffening elements 68 to the front cartridge 14. The stiffening elements 68 are oriented parallel to an axis A (FIG. 6) extending between the forward and rearward ends of the first bay 60.

Figure 13A:
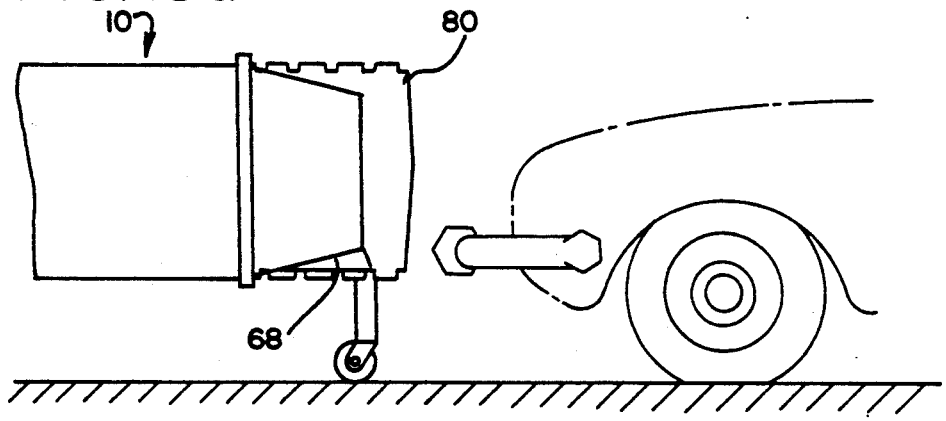
FIGS. 13a and 13b are views corresponding to FIG. 6 showing the manner in which the stiffening elements upwardly urge an impacting vehicle having a tendency to move under the first bay.
Figure 13B:
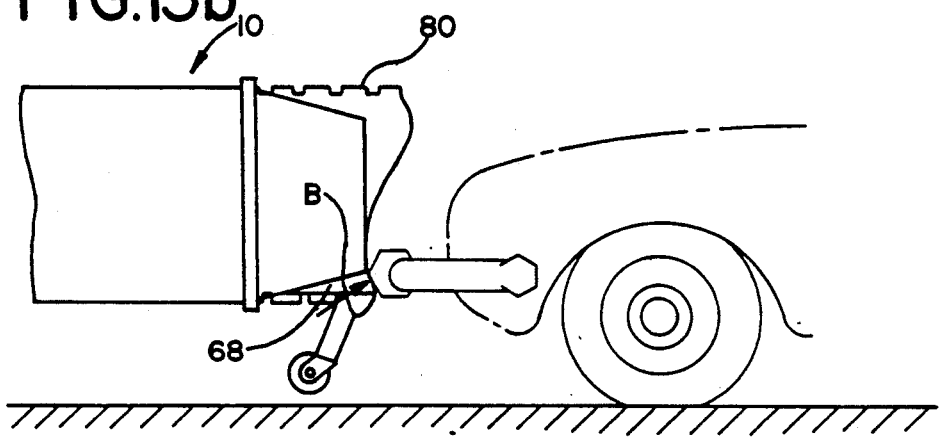

The first and second deformable elements 64, 66 and the stiffening elements 68 all act to urge an impacting vehicle upwardly which strikes the first bay 60 at a point near the roadway, toward a central portion of the first bay. As shown in FIGS. 6, 13a, and 13b, it is apparent that the stiffening elements 68 are positioned to engage the bumper of a low lying vehicle and to urge it upwardly (note the arrow B of FIG. 13b, which indicates the upwardly directed force applied to the illustrated bumper). Similarly, because the first deformable elements 64 have forward portions disposed near the bottom edge of the front cartridge 14, these first deformable elements 64 also tend to urge an impacting vehicle upwardly and thereby prevent any undesired upward movement of the impact attenuating device 10.

Figure 11A:
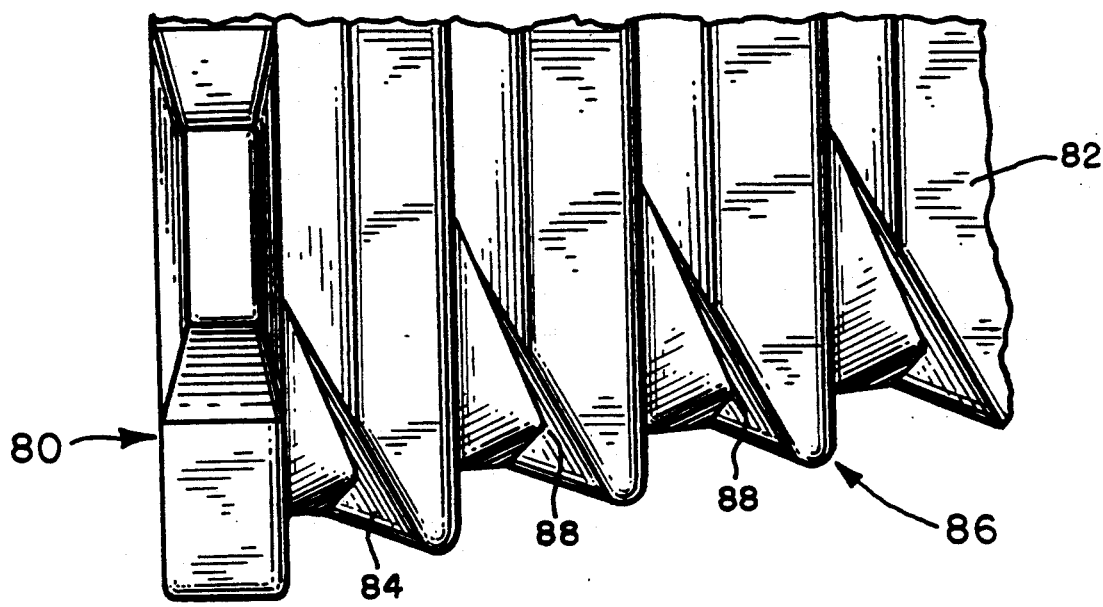
FIGS. 11a and 11b are top plan and side elevational views, respectively, of a corner of the collapsible element of the impact attenuating device of FIG. 2.
Figure 11B:
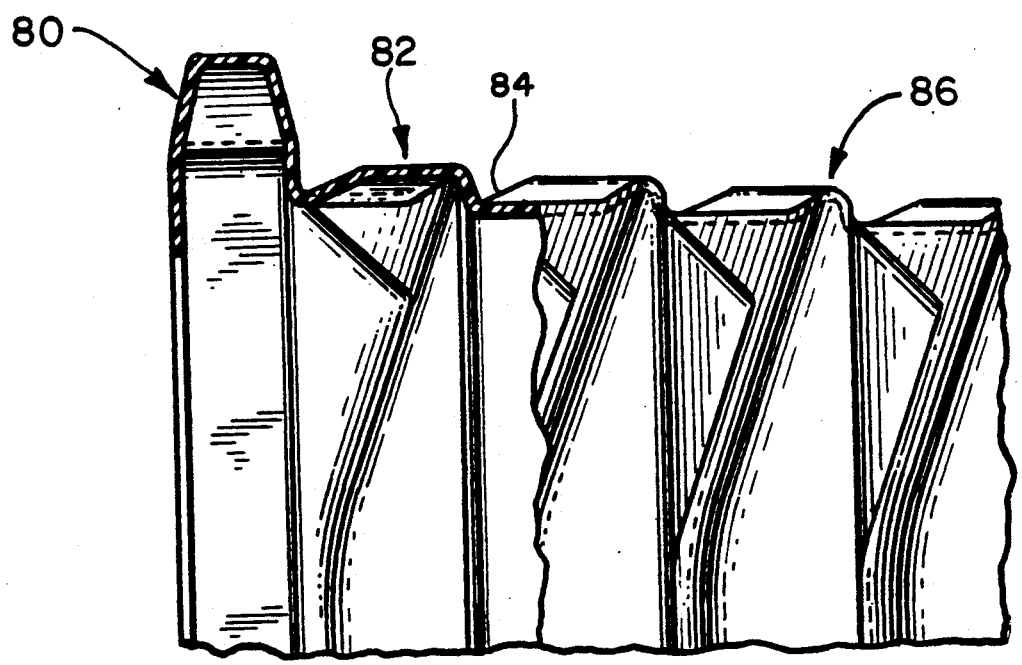

As best shown in FIGS. 3, 11a and 11b, the front end of the front cartridge 14 is partially covered by a collapsible element 80. This collapsible element 80 includes four side surfaces 82 that meet at corners 86. The side surfaces 82 define parallel pleats 84, and the corners 86 define recesses 88. The recesses 88 are deeper than the pleats 84, such that the entire collapsible element 80 can collapse axially and then spring back after a low energy impact. The collapsible element 80 includes an end portion 90 which defines folds 92 in a central portion.

Figure 12A:
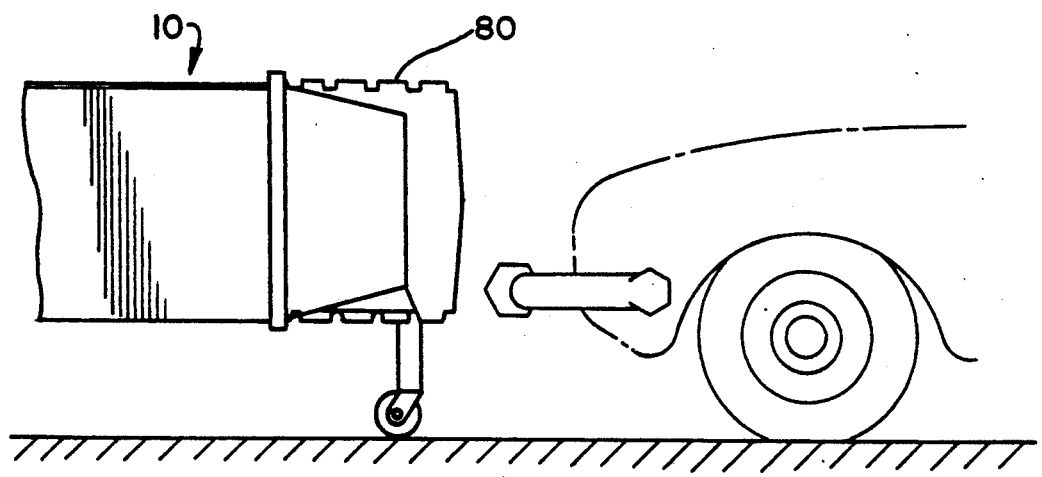
FIGS. 12a, 12b, and 12c are views corresponding to FIG. 6 showing the deformation and recovery of the collapsible element in a low speed impact.
Figure 12B:
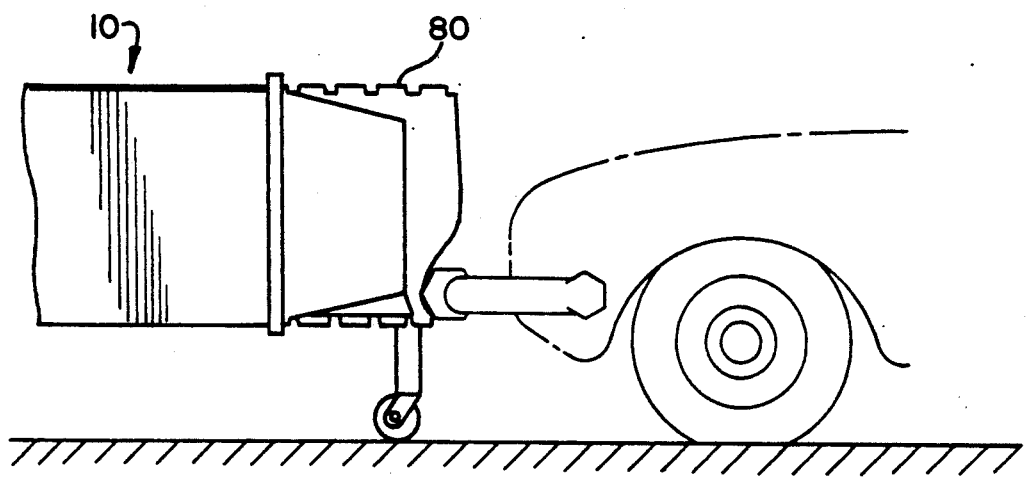
Figure 12C:
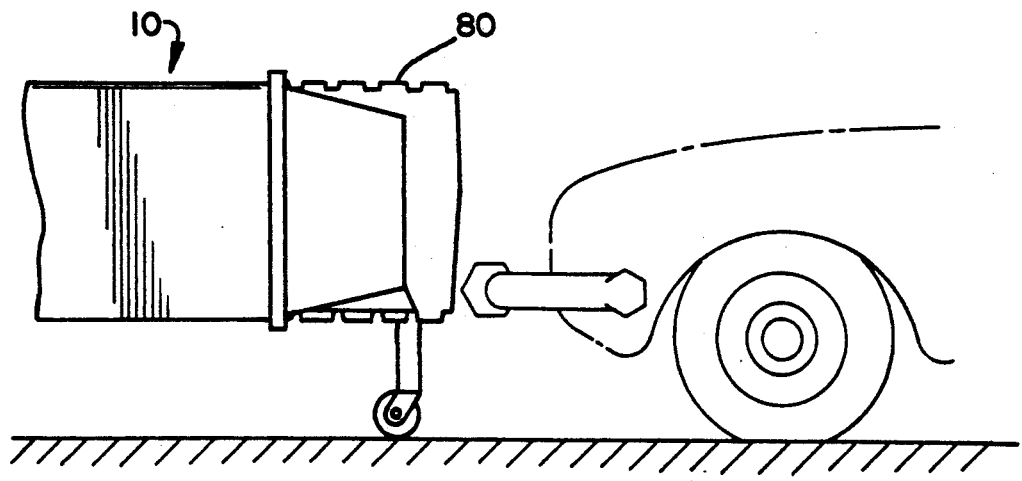

Returning to FIG. 6, it is apparent that the end portion 90 is spaced from the front surface of the front cartridge 14 by a horizontal distance S5 (four inches in this embodiment). The collapsible element 80 is preferably formed of a resilient material such as a linear low density polyethylene with a wall thickness of about 3/16 inch, and in the event of a low energy collision, the collapsible element 80 acts as a resilient spring which can collapse to a predetermined extent without damaging either of the cartridges 14, 16, as shown schematically in FIGS. 12a-12c. The collapsible element 80 prevents damage to the impact attenuating device 10 in a low speed impact, and therefore further reduces maintenance costs.

In order to further define the presently preferred embodiment of this invention, the following structural details are provided. It is, of course, intended that these details be regarded merely as illustrative and in no way as limiting the following claims.

In this preferred embodiment, the stiffening elements 68 are folded from sheet aluminum having a thickness of 0.063 inches. Aluminum alloy 5052 has been found suitable. The backing element 42 can be formed of a steel such as ASTM A-36 or AISI M-1020, such that the first and second parts 44, 46 are each approximately 3/16 inch in thickness and 1 1/4 inch in width. The elastomeric sheet 48 may be formed of material such as a plasticized polyvinyl chloride, and preferably has a thickness of about ⅛ inch. In addition to the adhesive mentioned in the above-identified Krage patent, Scotch Weld adhesive 3549BA supplied by 3M may be used in the event a longer setting time is desired. These adhesives are preferably applied between the diaphragms 18 and the upper and lower sheets 22, 24, between the upper and lower sheets 22, 24 and the side sheets 26, and between the rear cartridge 16 and the backing plate B.

Figure 14:
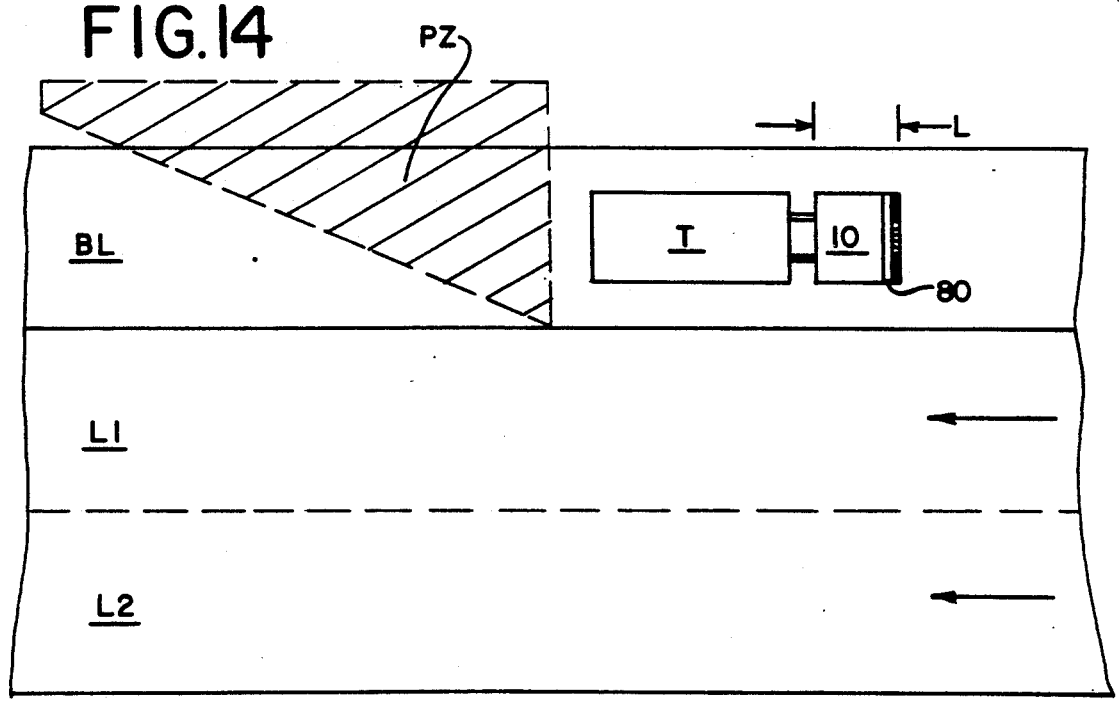
FIG. 14 is a plan view showing the device 10 in use alongside a roadway.

The impact attenuating device 10 is used to improve road safety. FIG. 14 shows a typical use on a roadway that includes two lanes of traffic L1 and L2 and a breakdown lane BL. In this example, traffic moves in the direction of the arrows in the lanes L1 and L2. As shown in FIG. 1, a vehicle such as the truck T is positioned in the breakdown lane BL in front of a work zone, for example an area requiring roadside maintenance. The track T acts as a shadow vehicle that casts a protective shadow over a protected zone PZ behind the truck T. This protected zone PZ is protected against intrusion by vehicles that may leave the lane L1 and enter the breakdown lane BL. As described above and shown in FIG. 1, the truck T is provided with the impact attenuating device 10 which performs three protective functions: it protects the truck T, an impacting vehicle (not shown), and the occupants of the impacting vehicle (not shown) in the event of a collision. As explained above, the front end of the attenuating device 10 is covered by a collapsible element 80 that protects the impact attenuating device 10 from damage in a low speed collision. The device 10 has a large energy absorbing capacity, preferably greater than 90,000 ft-lbs. The length L of the device 10 is preferably greater than 3 feet in order to provide adequate energy absorbing capacity without exceeding maximum acceptable deceleration limits for the impacting vehicle.

Of course, it should be understood that a wide range of changes and modifications can be made to the preferred embodiments described above. For example, the flanges 40 and backing elements 42 can be used to secure the energy absorbing element 12 to the backing plate B. Furthermore, the various aspects of this invention can be used independently of one another if desired, though it is presently preferred to use them together in combination as described above.

It is intended that the foregoing description be regarded as illustrative rather than limiting, and that it be understood that it is the following claims, including all equivalents, which are intended to define the scope of this invention.

I claim:

1. An impact attenuating device comprising:
    a deformable energy absorbing element;
    a mounting arrangement coupled to the energy absorbing element and configured to mount the energy absorbing element on a vehicle; and
    a collapsible element mounted to an end of the energy absorbing element to extend away from the mounting arrangement;
    said collapsible element having a foldable configuration which defines an end portion spaced from the energy absorbing element such that the end portion is movable toward the energy absorbing element by a selected amount in an impact without damaging the deformable energy absorbing element;
    said collapsible element being formed of a resilient material adapted to deform and then recover after a low energy impact;
    said collapsible element comprising a plurality of side surfaces which intersect at corners, wherein the side surfaces define generally parallel pleats, and wherein the corners define recesses that are deeper than the pleats.

2. The impact attenuating device of claim 1 wherein the side surfaces comprise an upper surface, a lower surface, and two edge surfaces, and wherein each of the edge surfaces extends between the upper surface and the lower surface.

3. The impact attenuating device of claim 2 wherein the collapsible element defines an array of folds extending between the upper and lower surfaces and situated in a central part of the end portion to extend away from the end portion toward the energy absorbing element.

4. The impact attenuating device of claim 3 wherein the collapsible element is formed of a thermoplastic material.

5. In an impact attenuating device of a type comprising an energy absorbing element and a mounting arrangement coupled to the energy absorbing element and configured to mount the energy absorbing element on a vehicle, the improvement comprising:
a first cartridge included in the energy absorbing element, said first cartridge comprising upper and lower sheets which define outer surfaces of the first cartridge;
upper and lower flanges defined by the upper and lower sheets, respectively, to extend outwardly from the first cartridge, said flanges defining first openings;
upper and lower backing plates, each aligned with a respective one of the flanges, said backing plates defining second openings aligned with the first openings; and
a plurality of fasteners positioned to pass through the first and second openings to mount the first cartridge to a supporting structure.

6. The invention of claim 5 wherein the cartridge defines a width, and wherein the upper and lower sheets, the upper and lower flanges, and the upper and lower backing plates extend over substantially the entire width.

7. The invention of claim 5 wherein each of the backing plates comprises first and second portions disposed at an angle to one another, wherein the first portions are oriented alongside the respective flanges and define the second openings, and wherein the second portions are secured to the respective sheets.

8. The invention of claim 5 wherein the energy absorbing element additionally comprises a second cartridge comprising:
additional upper and lower sheets which define outer surfaces of the second cartridge;
additional upper and lower flanges defined by the additional upper and lower sheets, respectively, to extend outwardly from the second cartridge, said additional flanges defining additional first openings;
additional upper and lower backing plates, each aligned with a respective one of the additional flanges, said additional backing plates defining additional second openings aligned with the additional first openings; and
wherein the second cartridge is included in the supporting structure and the fasteners pass through the first openings, the additional first openings, the second openings, and the additional second openings to secure the first and second cartridges together.

9. The invention of claim 8 wherein each of the cartridges further comprises an end wall adjacent the respective flanges, and wherein the end walls define third openings aligned with the first and second openings to receive the fasteners.

10. The invention of claim 9 further comprising an elastomeric sheet interposed between the end walls and between the flanges.

11. The invention of claim 8 further comprising an elastomeric sheet interposed between the first and second cartridges.

12. In an impact attenuating device of a type comprising an energy absorbing element comprising at least first and second bays, and a mounting arrangement coupled to the energy absorbing element and configured to mount the energy absorbing element on a vehicle, wherein the first bay is farther from the mounting arrangement than is the second bay, the improvement comprising:
a plurality of first deformable elements disposed in the first bay and a plurality of second deformable elements disposed in the second bay;
said first deformable elements comprising upper and lower first deformable elements having a maximum separation equal to a first distance;
said second deformable elements comprising upper and lower second deformable elements having a maximum separation equal to a second distance; and
said first distance being greater than said second distance.

13. The invention of claim 12 wherein the first and second bays define respective forward and rearward ends, and wherein the upper and lower first and second deformable elements each comprise a respective metal plate oriented to extend between the forward and rearward ends of the respective bay.

14. The invention of claim 12 further comprising a plurality of stiffening elements situated at least in part beneath the second deformable elements to deflect an impacting vehicle upwardly, toward a central portion of the energy absorbing element.

15. The invention of claim 14 wherein the first and second bays define respective forward and rearward ends, and wherein the stiffening elements are oriented parallel to an axis extending between the forward and rearward ends of the first bay.

16. In an impact attenuating device of a type comprising an energy absorbing element comprising at least first and second bays, and a mounting arrangement coupled to the energy absorbing element and configured to mount the energy absorbing element on a vehicle, wherein the first bay is farther from the mounting arrangement than is the second bay, wherein the first and second bays define upper and lower surfaces, and wherein each bay comprises at least one energy absorber, the improvement comprising:
means, situated in the first bay, for upwardly urging an impacting vehicle having a tendency to move under the first bay toward a vertically centered portion of the first bay and into contact with the at least one energy absorber of the first bay.

17. The invention of claim 16 wherein the urging means comprises upper and lower deformable elements having forward and rearward ends, wherein the forward ends are farther from the second bay than are the rearward ends; and
wherein the deformable elements are positioned to diverge from one another in a vertical direction such that the forward ends are separated by a greater vertical distance than the rearward ends.

18. The invention of claim 16 wherein the urging means comprises at least one stiffening element positioned at the lower surface of the first bay to deflect an impacting vehicle upwardly, toward the vertically centered portion of the first bay.

* * * * *